Sept. 27, 1932.  J. S. MILLER  1,879,395
AUTOMOBILE TIRE PROTECTOR
Filed Dec. 22, 1931  2 Sheets-Sheet 1
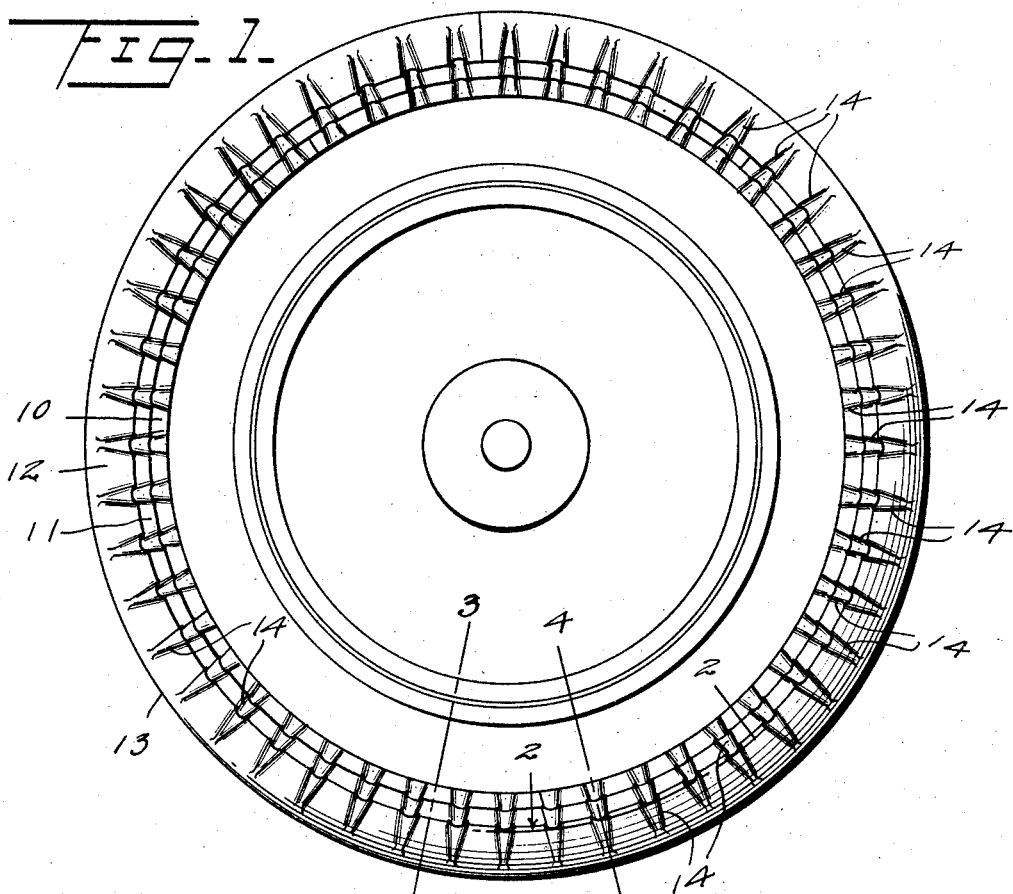
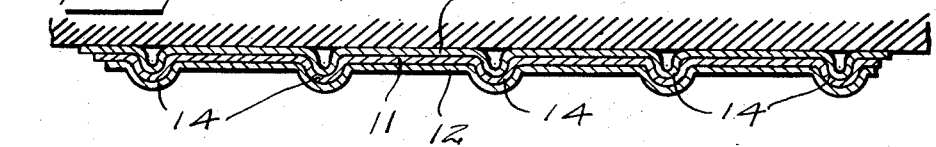
Inventor
J. S. Miller
By Watson E. Coleman
Attorney Sept. 27, 1932.    J. S. MILLER    1,879,395
AUTOMOBILE TIRE PROTECTOR
Filed Dec. 22, 1931    2 Sheets-Sheet 2
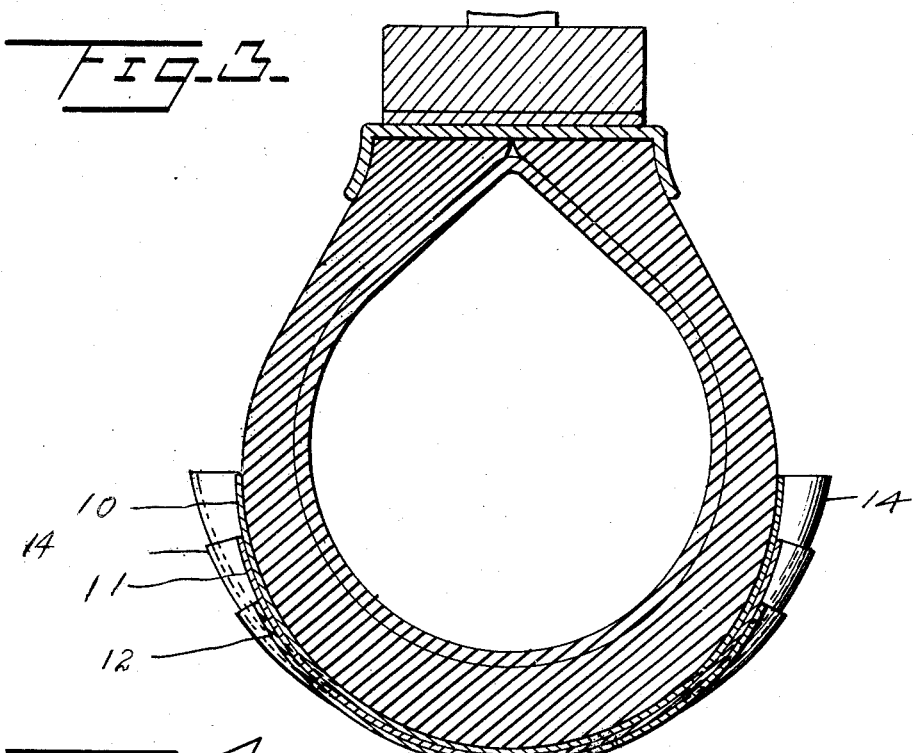
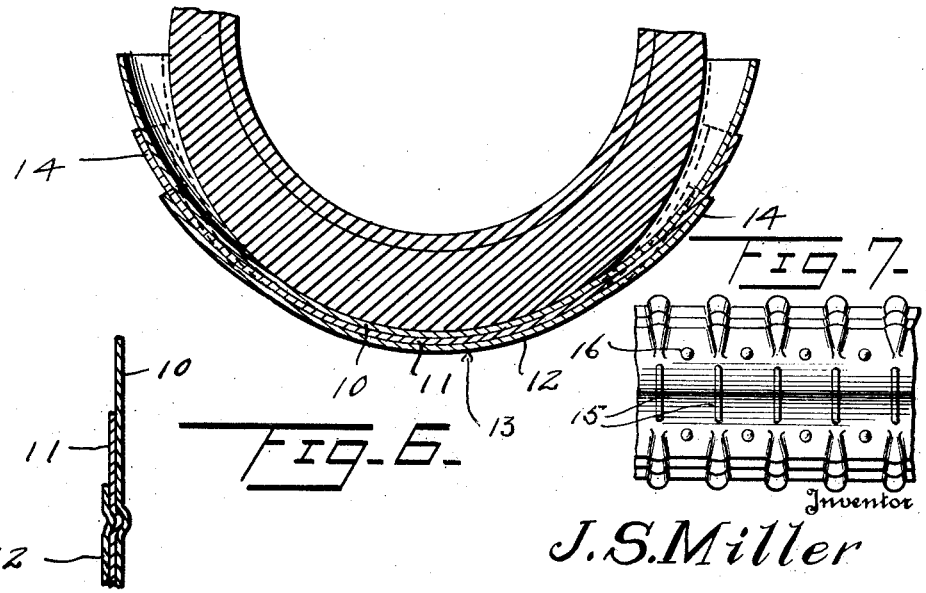

Patented Sept. 27, 1932

1,879,395

UNITED STATES PATENT OFFICE

JAMES S. MILLER, OF CLINTON, NEBRASKA

AUTOMOBILE TIRE PROTECTOR

Application filed December 22, 1931. Serial No. 582,627.

This invention relates to threads or protectors for automobile tires and particularly to a protector formed of sheet metal designed to surround the periphery of the tire and thus entirely protect it from punctures, cuts and abrasions.

A further object is to provide a protector of this character which will do away with the necessity of using tire chains.

A further object is to provide a protector of this character in which the lateral margins of the protector are crimped to thus cause the protector to conform to the cross section of the tire and provide projections at uniform intervals along the margins of the protector which will prevent the tire from skidding.

Other objects will appear in the course of the following description.

My invention is illustrated in the accompanying drawings, wherein:—

Figure 1 is a side elevation of an automobile wheel with my protector applied thereto;

Figure 2 is a longitudinal fragmentary section on the line 2—2 of Figure 1;

Figure 3 is a transverse section on the line 3—3 of Figure 1;

Figure 4 is a transverse section on the line 4—4 of Figure 1;

Fig. 5 is a fragmentary face view of the protector;

Fig. 6 is a fragmentary sectional view showing the means whereby the strips are temporarily engaged with each other before the crimps are made in the protector.

Figure 7 is a plan view of a slight modification.

Referring to the drawings, it will be seen from Figure 3 that the protector consists of three strips of sheet metal designated respectively 10, 11 and 12. The inner strip 10 is of rustless steel and is approximately eight inches wide and long enough to just go around the casing and the second sheet 11 is also of rustless steel and has a width of about seven inches. The third sheet 12 is approximately six inches wide. These strips are each welded at their ends. The first two sheets 10 and 11 are preferably about one-sixteenth inch thick but the third sheet 12 is approximately one-eighth of an inch thick. However, it will be understood that these sheets may be of any desired thickness. The middle portion of the protector, which middle portion is designated 13, is plain, that is, is uncrimped, but the lateral margins of the protector are crimped as at 14, these crimps occurring approximately every two inches. In order to do this, the several sheets are held from lateral or longitudinal movement relative to countersinks or by rivets or by any other suitable means and the several sheets are placed in a die and the lateral margins are pressed out to form convolutions or crimps 14 as previously described. These crimped portions do away with the necessity of using tire chains and preferably will be about one-half an inch in width.

It will be seen that I provide three thicknesses of material on the tread portion of the protector, thus preventing nails or other sharp pointed objects from piercing the protector but that on the sides of the protector three thicknesses are not necessary as a stone, nail or other object which might cut or pierce the tire will only inflict a glancing blow on these parts.

In putting these protectors in place, the tire and the inner tube are, of course, deflected, inserted within the protector and then the inner tube is inflated again, thus forcing the outer tube or shoe in place within the protector. The protector, under these circumstances, is, of course, held upon the tire and cannot become detached unless the tire be deflated. A protector of this character will keep tires from wearing, puncturing or being cut and thus add very greatly to the life of the tire and at the same time will do away with the necessity of using tire chains or like devices for the purpose of preventing the tire from skidding. It will do away also with the necessity of using mud lugs where the wheels have become mired.

I do not wish to be limited to the formation of the protector with a plain tread surface as shown in Figures 1, 3 and 4 and in Figure 7 I have illustrated the tread face of the protector as being formed with slight corrugations designated 15 extending transversely of the tread face and with bosses 16. These corrugations so formed will secure attractive surface and prevent skidding. It will, therefore, be understood that the middle portion or tread surface of my protector may be made either plain or corrugated as desired.

I claim:—

A tire protector comprising a plurality of metallic strips, each strip having its ends connected, the strips being concentric to each other, the innermost strip being widest, the outermost strip narrowest, the lateral margins of all of the strips being formed with outwardly projecting crimps at intervals whereby to engage the strips with each other against circumferential movement, to cause the strips to conform transversely to the shape of the tire and provide lateral corrugations to secure traction.

In testimony whereof I hereunto affix my signature.

JAMES S. MILLER.